(12) United States Patent
Jeong et al.

(10) Patent No.: US 6,294,601 B1
(45) Date of Patent: Sep. 25, 2001

(54) SILICA GLASS COMPOSITION

(75) Inventors: Won-il Jeong, Daegu; Young-min Baik, Gumi, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/181,821

(22) Filed: Oct. 29, 1998

(30) Foreign Application Priority Data

Oct. 29, 1997 (KR) .................................................. 97-56025
Oct. 29, 1997 (KR) .................................................. 97-56026

(51) Int. Cl.$^7$ ....................................................... C08J 5/11
(52) U.S. Cl. ........................ 524/315; 524/317; 524/379; 524/388; 524/493; 524/494
(58) Field of Search ..................................... 524/317, 493, 524/494, 315, 379, 388

(56) References Cited

U.S. PATENT DOCUMENTS

| | | | |
|---|---|---|---|
| 4,002,590 | * | 1/1977 | Yoshida et al. .................. 260/29.6 S |
| 4,162,238 | * | 7/1979 | Bergna .................................. 106/84 |
| 4,350,785 | * | 9/1982 | Habib ...................................... 524/55 |
| 4,801,318 | | 1/1989 | Toke et al. . |
| 4,859,525 | * | 8/1989 | Hench et al. ......................... 428/260 |
| 4,943,542 | * | 7/1990 | Hayashi et al. ........................ 501/12 |
| 4,956,404 | * | 9/1990 | Pelzig ...................................... 524/48 |
| 5,169,421 | | 12/1992 | Yagi et al. . |
| 5,240,488 | | 8/1993 | Chandross et al. . |
| 5,314,520 | | 5/1994 | Yagi et al. . |
| 5,565,014 | | 10/1996 | Fleming, Jr. . |
| 5,716,424 | * | 2/1998 | Mennig et al. ........................ 65/60.1 |
| 5,871,558 | * | 2/1999 | Takei et al. ............................. 501/12 |

FOREIGN PATENT DOCUMENTS

| | | |
|---|---|---|
| 1-119524 | 5/1989 | (JP) . |
| 2-248332 | 10/1990 | (JP) . |
| 3-137029 | 6/1991 | (JP) . |
| 9-208235 | 8/1997 | (JP) . |

OTHER PUBLICATIONS

"Science Of Sol–Gel Process" by Sakubana, Sumio.

Japanese Patent Office Action for patent application No. 10–305324 (and partial English language translation).

Korean Patent Office Action for patent application No. 10–1997–0056025 (and partial English language translation).

Korean Patent Office Action for patent application No. 10–1997–0056026 (and partial English language translation).

* cited by examiner

*Primary Examiner*—Judy M. Reddick
(74) *Attorney, Agent, or Firm*—Robert E. Bushnell, Esq.

(57) ABSTRACT

A silica glass composition having silica and a binder is provided. The binder is methylcellulose or a polymer comprising repeating units represented by the formula (1):

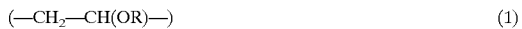

$$(-CH_2-CH(OR)-) \qquad (1)$$

where R is a $C_1$–$C_{12}$ alkyl group or is the acetyl group. The silica glass composition according to the present invention includes a binder cheaper than the conventional polyethyloxazoline and is not hazardous to humans. The air bubbles removing efficiency can be enhanced by reducing the viscosity of the sol, and the content of solid in the sol can be increased by using the silica glass composition according to the present invention. Also, the strength of the wet gel is increased allowing the gel to be easily handled in a subsequent process. The silica glass composition according to the present invention can be used in manufacturing silica glass for a semiconductor device and an optical lens as well as a tube for optical fiber.

4 Claims, No Drawings

SILICA GLASS COMPOSITION

CLAIM OF PRIORITY

This application makes reference to, incorporates the same herein, and claims all benefits accruing under 35 U.S.C. §119 from applications for SILICA GLASS COMPOSITION earlier filed in the Korean Industrial Property Office on the 29$^{th}$ of October 1997 and there duly assigned Serial No. 56025/1997, and for SILICA GLASS COMPOSITION earlier filed in Korean Industrial Property Office on the 29$^{th}$ of October 1997 and there duly assigned Serial No. 56026/1997.

BACKGROUND OF THE INVENTION

1. Field of the Invention

The present invention relates to a silica glass composition, and more particularly, to a composition for use in preparing silica glass by a sol-gel process.

2. Description of the Related Art

Generally, silica glass is transparent, chemically inert and has useful characteristics including excellent thermal stability, strength and a low thermal expansion coefficient. These characteristics allow silica glass to be extremely useful for optical devices such as optical fibers or optical lenses.

An optical fiber is basically comprised of a core and a cladding having a refractive index different from that of the core so that total reflection of light occurs at the core. In connection with the total reflection of light, the refractive index of the cladding is usually about 1% lower than that of the core. A core having a refractive index of 1.47 and a cladding having a refractive index of 1.46 are generally used.

To manufacture an optical fiber, an optical fiber preform comprised of a core rod and an overcladding tube surrounding the core rod is first fabricated. Then, the optical fiber preform is heat-treated and elongated to form the optical fiber. The manufacture of the overcladding tube can require special silica glass manufacturing processes.

Some examples of processes for making silica glass of the contemporary art are shown, for example, in the following U.S. Patents. U.S. Pat. No. 5,169,421 to Yagi et al., entitled Method Of Manufacturing Silica Glass Optical Waveguide Preform, discusses an extrusion method for forming a cladding. This method does not use a sol-gel process, but rather uses a kneadable plastic composition of silica with a higher ratio of silica to water than found in a gel. This composition also contains an additive referred to by Yagi et al. as a binder, which can be methylcellulose or another organic substance. This patent discusses a composition with three parts of methylcellulose to 100 parts silica. U.S. Pat. No. 5,314,520 to Yagi et al., entitled Method for Manufacturing Optical Fiber Preform, also discusses an extrusion method and a composition with three parts methylcellulose to 100 parts silica. U.S. Pat. No. 4,801,318, to Toki et al., entitled Silica Glass Formation Process, discusses a sol-gel process for making silica glass involving hydrolyzing a silicon alkoxide solution. U.S. Pat. No. 5,565,014, to Fleming, entitled Process Of Manufacturing A Vitreous Silica Product Including Hydorthermally Drying A Collordal Sol-Gel, describes a sol-gel process involving the addition of polyethyloxazoline to the sol before gelling. U.S. Pat. No. 5,240,488, to Chandross et al, Manufacture Of Vitreous Silica Product Via A Sol-Gel Process Using A Polymer Additive, discusses a sol-gel process involving an additive which is an organic polymer and which is sometimes referred to as a binder. Characteristics of potential additives are discussed, but the only materials specifically discussed as additives are polyethyloxazoline, polymethyloxazoline, polyacrylamide, and cationic polymers containing [—CH$_2$—N+(CH$_3$)$_2$—CH$_2$—] units in the backbone.

One method for manufacturing an overcladding tube formed of silica glass using a sol-gel process will now be briefly described. First, silica particles are mixed with deionized water and a dispersant. Then, a binder and a plasticizer are added to the mixture and then mixed sufficiently to form a sol. The sol is subjected to an aging-treatment for a predetermined time. Air bubbles are removed from the aging-treated sol, a gelling agent is added to the sol which is then poured into a mold.

When gelation is completed, the resultant gel is removed from the mold and then dried. Thereafter, the dried gel is heat-treated to remove organic substances in the gel. Subsequently, dehydroxylation and sintering processes are performed on the resulting gel, thereby completing an overcladding tube formed of silica glass.

In the above-described manufacturing process, polyethyloxazoline is usually used as the binder. However, because this compound is hazardous to humans and expensive, there is an increasing demand and a need for a material to be a substitute for polyethyloxazoline. Moreover, a wet gel prepared using polyethyloxazoline is not strong enough to be easily handled in subsequent processing. More strength would be highly desirable in the wet gel.

Finding a replacement for polyethyloxazoline is not a trivial task. The additive, or binder, for the silica glass composition must satisfy the following requirements. First, the binder must be highly soluble in a sol dispersion medium. Second, the binder should be homogeneously dispersed between particles, but be present in a small amount. If the binder is used excessively, too many pores are generated in the silica glass, which is not desirable.

Based on my observation of the art, I have discovered that what is needed is a silica sol-gel composition which yields improved strength in the gelled sol. Moreover, this composition should not contain a toxic polymer such as polyethyloxazoline and should be less expensive than other compositions.

SUMMARY OF THE INVENTION

Therefore, it is an object of the present invention to provide an improved composition of and process for making silica glass.

It is another object to provide a silica glass composition for making a sol-gel that improves the strength of the wet gel.

It is another object to provide an improved silica glass composition that does not contain an additive, or binder, which is toxic to humans.

It is a further object to provide a silica glass composition that is inexpensive.

It is a still further object to provide an improved method of making a molded silica glass item by use of the silica glass composition of the present invention.

Accordingly, to achieve these objectives, there is provided a silica glass composition having silica and an additive, or binder, wherein the binder is methylcellulose, or is a polymer comprising repeating units represented by the formula (—CH$_2$—CH(OR)—), where R is a C$_1$–C$_{12}$ alkyl group, or is the acetyl group.

DESCRIPTION OF THE PREFERRED EMBODIMENTS

The silica glass composition according to the present invention includes silica and a binder, with the binder being methylcellulose or a polymer having a repeating unit represented by formula (1), $$(-CH_2-CH(OR)-) \quad (1)$$

where R is $C_1-C_{12}$ alkyl group, that is, an alkyl group containing between 1 and 12 carbons atoms, or where R is the acetyl group, $CH_3(C=O)-$. When R is the acetyl group, the polymer is poly(vinyl is acetate).

The weight average molecular weight of the polymer represented by the formula (1) is preferably 50,000 to 500,000, because the polymer exhibits excellent solubility, heat-decomposition property and dispersibility to a sol suspension within this range.

The content of the additive, or binder, is preferably 0.05 to 1.0 wt % based on the weight of silica, that is, the ratio of binder to silica is in the range of between approximately 0.05:100 and 1.0:100. More preferably the content of the binder is 0.1 to 0.6 wt %, that is the ratio of binder to silica is in the range of between approximately 0.1:100 and 0.6:100. Here, if the content of the binder is greater than 1.0 wt %, silica glass which has poor transparency is obtained. Also, if the content of the binder is less than 0.05 wt %, cracks are easily generated in the silica glass after being dried. Both cases are not desirable.

When forming a sol-gel, the composition also includes a dispersant, a plasticizer, a gelling agent and a solvent, like the conventional glass composition. Here, the dispersant, the plasticizer, the gelling agent and the solvent are not specifically restricted but materials generally used in preparing silica glass may be used. Levels of the dispersant, the plasticizer, the gelling agent and the solvent may be similar to those used in other sol-gel methods.

As the dispersant, a quaternary ammonium hydroxide compound such as tetraethylammonium hydroxide or tetraethylammonium hydroxide is used. These materials help silica disperse homogeneously into the composition, and stabilize the silica-dispersed sol electrostatically.

As the plasticizer, a polyhydric alcohol, for example, glycerin, ethylene glycol, or 2-methylpropane-1,2,3-triol, is used.

The gelling agent is an aqueous aliphatic ester of an acid selected from the group consisting of formic acid, lactic acid and glycolic acid. Among these esters, in the present invention, ethyl lactate or methyl lactate is preferably used as the gelling agent. With the composition of the present invention, the time required for the sol to gel is easily adjusted and air bubbles may be removed from the sol immediately before molding, thereby reducing the probability of generating cracks after drying, and reducing the overall shrinking ratio. As a result, a high-density silica glass tube can be manufactured with few pores being generated after sintering.

The present invention will now be described with reference to embodiments but the invention is not limited thereto.

EXAMPLE 1

In a first embodiment of the invention, 10.4 ml of tetramethylammonium hydroxide (TMAH) aqueous solution (25 wt % in water) was added to 100 g of fulmed silica (Degussa Co. of Germany) is and 117.39 g of deionized water (Here, the mixing weight ratio of fumed silica to deionized water is 46:54.) and then the resultant was homogeneously mixed using a blender.

1.3 g of glycerin and 0.2 g of methylcellulose were added to the mixture and then mixed in a homogenizer at a rate of 8000 rpm for 3 minutes to prepare a sol. Thereafter, the sol was aged in a cool room maintained at a temperature of 6–10° C. for 20 hours. 1.35 ml of methyl lactate was added to the sol and the sol was homogeneously mixed. Then, air bubbles in the sol were removed. The resultant sol was poured into a mold.

After gelation was completed, the wet gel was separated from the mold, dried in an oven controlled under constant temperature and humidity of 30 °C. and 85% RH for a few days, and then further dried at a temperature of 120 °C. for 5 hours to remove remaining moisture.

After drying, the obtained gel was heat-treated to remove organic substances and then the gel was dehydroxylated by treatment at about 800 °C. with chlorine ($Cl_2$) gas. Subsequently, the remaining chlorine ($Cl_2$) gas was removed using oxygen ($O_2$) gas. The resultant was sintered at about 1300 °C., thereby completing a silica glass overcladding tube.

EXAMPLE 2

In a second embodiment of the invention, the procedure was carried out in the same manner as described in Example 1, with the exception that 0.5 g of methylcellulose was used, instead of 0.2 g of methylcellulose, to complete a silica glass overcladding tube.

EXAMPLE 3

In a third embodiment of the invention, the procedure was carried out in the same manner as described in Example 1, with the exception that 0.2 g of poly(vinylacetate) having weight average molecular weight of 52700 was used instead of 0.2 g of methylcellulose.

EXAMPLE 4

In a fourth embodiment of the invention, the procedure was carried out in the same manner as described in Example 1, with the exception that 0.5 g of poly(vinyl acetate) having weight average molecular weight of 52700 was used instead of 0.2 g of methylcellulose.

COMPARATIVE EXAMPLE

A comparative example was carried out in the same manner as described in Example 1, with the exception that polyethyloxazoline was used as a binder, instead of methylcellulose.

The strengths of the wet gels prepared in the Examples 1 through 4 and the Comparative Example were measured. It was observed that the strength of the wet gels prepared in each of Examples 1 through 4 was greater than that of the gel prepared in the Comparative Example. The strengths of the gels prepared in Examples 1 through 4 were sufficient that they could be easily handled.

Moreover, during preparation of the sols, the viscosity of each of the sols according to the Examples 1 through 4 was less than that of the sol according to the Comparative Example. This difference allowed for enhanced efficiency of air bubble removal in the sols of Examples 1 through 4 compared with the Comparative Example. This enhanced air bubble removal allowed the content of solid in the sol to be increased in Examples 1 through 4 compared to the Comparative Example.

The silica glass composition according to the present invention includes a binder which is cheaper than the conventional polyethyloxazoline, and which is not hazardous to humans as is polyethyloxazoline. Moreover, air bubble removal efficiency can be enhanced by reducing the viscosity of the sol, and the content of solid in the sol can be increased, by using the silica glass composition according to the present invention. Also, the strength of the wet gel is increased to thus be easily handled in a subsequent process.

The silica glass composition according to the present invention is suitable for use in fabricating silica glass for a semiconductor device and an optical lens as well as a tube for optical fiber.

What is claimed is:

1. A composition of matter for preparing silica glass, comprising:

silica and poly(vinyl acetate), the weight ratio of poly(vinyl acetate) to silica being in a range of from 0.05:100 to 1:100;

a quaternary ammonium hydroxide;

a polyhydric alcohol;

water-soluble aliphatic ester of an acid selected from the group consisting of lactic acid, formic acid and glycolic acid; and a solvent.

2. The composition of matter of claim 1, further comprised of the weight ratio of poly(vinyl acetate) to silica being in a range of from 0.1:100 to 0.6:100.

3. The composition of matter of claim 1, further comprised of the weight average molecular weight of said poly(vinyl acetate) being in a range of from 50,000 to 500,000.

4. A composition of matter, for preparing silica glass, comprising:

silica and poly(vinyl acetate), the weight average molecular weight of the poly(vinyl acetate) being in a range of from 250,000 to 500,000;

a quaternary ammonium hydroxide;

a polyhydric alcohol;

water-soluble aliphatic ester of an acid selected from the group consisting of lactic acid, formic acid and glycolic acid; and a solvent.

* * * * *